US009223455B2

(12) United States Patent
Yi et al.

(10) Patent No.: US 9,223,455 B2
(45) Date of Patent: Dec. 29, 2015

(54) USER PREFERENCE ANALYSIS METHOD AND DEVICE

(71) Applicant: Samsung Electronics Co., Ltd., Gyeonggi-do (KR)

(72) Inventors: Sangho Yi, Seoul (KR); Boseok Moon, Gyeonggi-do (KR); Sangbum Suh, Seoul (KR); Hyunjin Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/646,136

(22) Filed: Oct. 5, 2012

(65) Prior Publication Data

US 2013/0091450 A1    Apr. 11, 2013

(30) Foreign Application Priority Data

Oct. 6, 2011    (KR) ...................... 10-2011-00101661

(51) Int. Cl.
*G06F 3/048*    (2013.01)
*G06F 17/30*    (2006.01)

(52) U.S. Cl.
CPC .......... *G06F 3/048* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,353,246 B1 * | 4/2008 | Rosen et al. | 709/202 |
| 2007/0168357 A1 * | 7/2007 | Mo | 707/10 |
| 2009/0119268 A1 * | 5/2009 | Bandaru et al. | 707/3 |
| 2009/0276285 A1 * | 11/2009 | Nomula | 705/10 |
| 2010/0082644 A1 | 4/2010 | Ly et al. | |
| 2010/0278381 A1 * | 11/2010 | Tessman et al. | 382/100 |
| 2011/0035211 A1 * | 2/2011 | Eden | 704/10 |
| 2012/0130819 A1 * | 5/2012 | Willcock et al. | 705/14.66 |
| 2012/0290433 A1 * | 11/2012 | England et al. | 705/26.7 |

* cited by examiner

*Primary Examiner* — Matt Kim
*Assistant Examiner* — Hua Lu
(74) *Attorney, Agent, or Firm* — The Farrell Law Firm, P.C.

(57) ABSTRACT

A user preference analysis method and device are provided for providing a user with customized content through preference analysis based on the user's content consumption activity. The user preference analysis method includes displaying content data on a screen of the device in response to a user input; recording content information about the content data displayed on the screen; analyzing a user preference based on the recorded content information; and storing a user preference analysis result for the content data.

18 Claims, 7 Drawing Sheets

USER PREFERENCE ANALYSIS METHOD AND DEVICE

PRIORITY

This application claims priority under 35 U.S.C. §119(a) to Korean Application Serial No. 10-2011-00101661, which was filed in the Korean Intellectual Property Office on Oct. 6, 2011, the content of which is incorporated herein by reference.

BACKGROUND OF THE INVENTION

1. Field of the Invention

The present invention relates generally to a user preference analysis method and device and, in particular, to a user preference analysis method and device that provide a user with customized content using preference analysis based on the user's content consumption activity.

2. Description of the Related Art

Typically, mobile devices are designed to support various applications including games, Social Network Services (SNSs), messengers, email, web browsers, e-book readers, etc. For such multipurpose devices, it is an attractive scheme to provide a user with the content customized according to the user's preferences in view of the user, service provider, and mobile manufacturer. Accordingly, studies are being conducted for providing content, which is customized based on user preference analysis.

Conventional user-preferred content analysis methods analyze a user activity log recorded in use of the mobile device when consuming content. Basically, these methods are categorized into two categories: (1) where the mobile device records the user activities (such as content-saving, content up/download, content movement, copy, web-browsing key-input pattern, and accessed content (e.g., mobile application data)) and analyzes the recorded user activity; and (2) where the mobile device scrapes a User Interface (UI) screen to detect the user interface type and installed mobile applications.

In the first method category, the mobile device extracts the user's content utilization frequency, utilization time, and content access pattern, analyzes the extracted information to identify any user-preferred subjects, and acquires user preferences based on the analysis result. The analysis result is then used to sort the content, services, and advertisements available for the mobile device and recommend content to the user.

However, these conventional user activity tracking-based preference analysis methods are restricted to collecting relatively broad-spectrum activity information. For example, when a user is browsing a webpage using a mobile device, a normal webpage is commonly presented with long scroll bars, due to small display of the mobile device. As a result, the user will often have to scroll through the content on the webpage that the user is not interested in, before locating the actual desired content.

However, the conventional methods regard all of the content provided on the webpage as the desired content of the user, which wastes time and resources by analyzing large volumes of noise content, i.e., content out of the user's interest range.

Further, the noise content degrades the reliability of the user-preferred content analysis and, as the noise increases, the reliability degradation worsens, resulting in a "Garbage In Garbage Out" effect.

Accordingly, the conventional user preference analysis methods fail to produce reliable user preferences, thereby resulting in failure of user customized content and advertisements provision services.

SUMMARY OF THE INVENTION

The present invention has been made to address at least the above problems, and to provide at least the advantages described below.

Accordingly, an aspect of the present invention is to provide a user preference analysis method and device that provide user customized services based on user preferences analyzed from content in which the user is actually interested.

Another aspect of the present invention is to provide a user preference analysis method and apparatus that improve preference analysis result reliability by taking into consideration the time for which content is presented on a screen of the apparatus.

Another aspect of the present invention is to provide a user preference analysis method and apparatus that improve preference analysis result reliability by analyzing content that is actually browsed by the user with a record of content data played on a screen and an exposed time of the content data on the screen, in consideration of a display constraint of the apparatus, e.g., small screen size.

In accordance with an aspect of the present invention, a user preference analysis method of a device is provided. The method includes displaying content data on a screen of the device in response to a user input; recording content information about the content data displayed on the screen; analyzing a user preference based on the recorded content information; and storing a user preference analysis result for the content data.

In accordance with another aspect of the present invention, a user preference analysis method of a device is provided. The method includes recording content information about content data that is currently displayed on a screen of the device; extracting keywords and images from the recorded content information; analyzing a user preference for each extracted keyword and image; and storing the analyzed user preference for each extracted keyword and image.

In accordance with another aspect of the present invention, a device that performs user preference analysis is provided. The device includes a display unit that displays content; an input interface unit that receives a user input for navigating content data of the content displayed on the display unit; a storage unit that stores a program for analyzing a user preference, stores content information for use in preference analysis, and stores a user preference analyzed using the content information; and a control unit that records the content information about the content data that includes a presentation time duration and a presentation time of the content data on the display unit and computes the user preference for the content data.

BRIEF DESCRIPTION OF THE DRAWINGS

The above and other aspects, features, and advantages of certain embodiments of the present invention will be more apparent from the following detailed description when taken in conjunction with the accompanying drawings, in which.

DETAILED DESCRIPTION OF EMBODIMENTS OF THE INVENTION

Various embodiments of the present invention are described in detail below with reference to the accompanying drawings. Throughout the drawings, the same reference numbers are used to refer to the same or like parts. Additionally, detailed descriptions of well-known functions and structures incorporated herein may be omitted to avoid obscuring the subject matter of the present invention.

In accordance with an embodiment of the present invention, a user preference analysis method and device are provided, which analyze user preferences in consideration of a presentation time of content presented on a screen of the device.

In accordance with an embodiment of the present invention, when the user consumes the content displayed on the device, the device analyzes user preferences based on the content data presented on the screen, not merely from all of the content data, e.g., all of the content data on a webpage. Further, the device analyzes user preferences based on the presentation time of the content data presented on the screen.

Although embodiments of the present invention will be described below with reference to a mobile device, the present invention is not limited thereto, and may be applied to other types of devices. For example, the mobile device can include mobile communication terminals operating with respective communication protocols, Tablet Personal Computers (PCs), Smartphones, Portable Media Players (PMPs), media players, portable game consoles, and Personal Digital Assistants (PDAs). Additionally, the other types of devices include display devices such as a Digital Television (TV), Digital Signage (DS), a Large Format Display (LFD), and a laptop computer.

As described above, a device according to an embodiment of the present invention records content data presented on a screen, records the presentation time (or display time) of the content data presented on the screen, and analyzes user preferences based on the content data actually browsed by the user based on the recorded information.

For example, the content referred to herein may include mobile applications such as games, SNSs, email, webpages, e-books, etc. Additionally, content data refers to data constituting the content. The content data includes at least one of text data and image data. Basically, the content data represents the currently displayed data.

Further, recording information and analyzing the user preferences based on the recorded information may include recording content data displayed on the screen of the mobile device, a presentation time of the content data displayed on the screen, and play start and end time, extracting a keyword and image type related to the user based on the recorded information, and analyzing the keyword and image preferences based on the types of the extracted keyword and image.

According to an embodiment of the present invention, a mobile device records a presentation time and a presentation time duration for the content data presented on the screen of the mobile device and computes the user preferences using the presentation time and a presentation time duration as input parameters.

Figure 1:
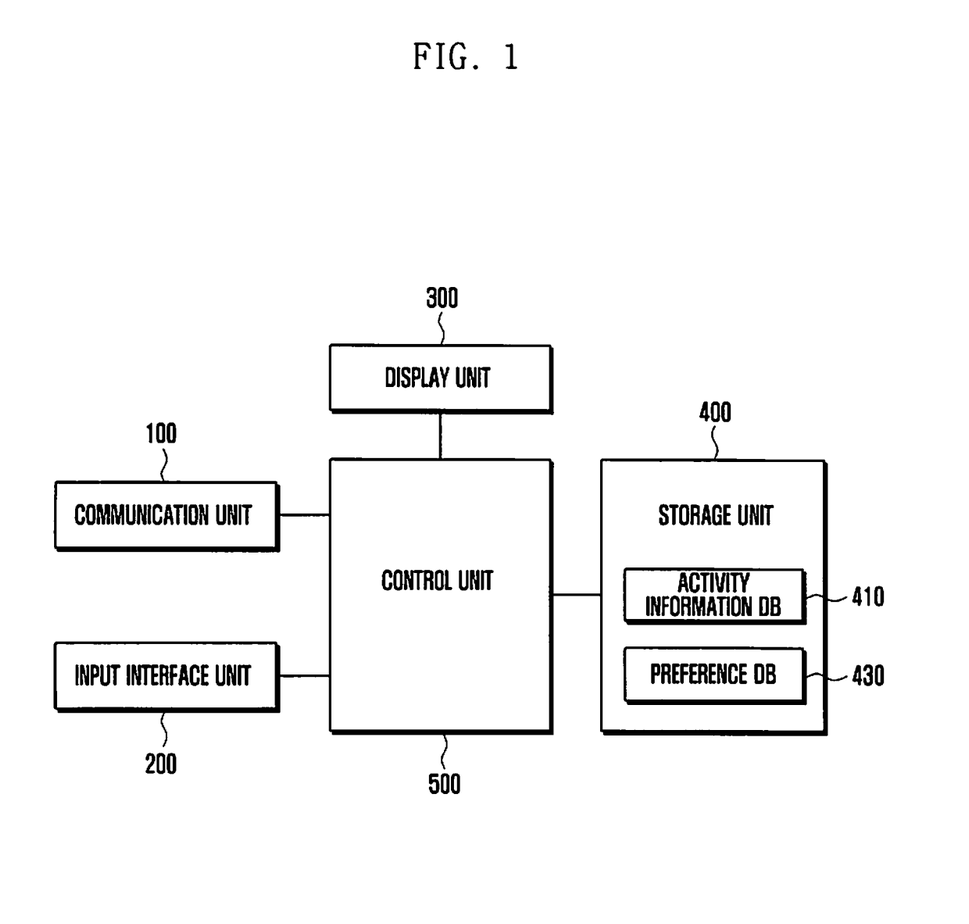
FIG. 1 is a block diagram illustrating a mobile device according to an embodiment of the present invention.

FIG. 1 is a block diagram illustrating a mobile device according to an embodiment of the present invention.

Referring to FIG. 1, the mobile device includes a communication unit 100, an input interface unit 200, a display unit 300, a storage unit 300, and a control unit 500. Although not illustrated, the mobile device can further include an audio processing unit including a microphone and a speaker, a digital broadcast unit (e.g., Digital Multimedia Broadcast (DMB) and Digital Video Broadcasting (DVB) modules), a camera, a short range wireless communication unit (such as Bluetooth, Infrared Data Association (IrDA), Radio Frequency Identification (RFID), and Near Field Communication (NFC) modules), and a battery.

The communication unit 100 establishes a radio link with another device or a content server through a communication network. For example, the communication unit 100 may include a Radio Frequency (RF) module for supporting cellular mobile voice, video, and data communication and an Internet Protocol (IP) communication service module. Particularly, the communication unit 100 is responsible for establishing connection with a content server or another user device to receive the content interested by the user.

The input interface unit 200 receives user input for configuring or executing operations supported by the mobile device and generates an input signal to the control unit 500. The input interface unit 200 is provided with input keys for generating input signals (e.g. number keys and character keys), function keys, and soft keys. When the display unit 300 is implemented with a touch input interface, the display unit 300 can act as the input interface unit 200. That is, the input interface unit 200 can include at least one of a touchpad, a touchscreen, and a physical keypad. Particularly, the input interface unit 200 is capable of detecting the user input made for browsing the content on the screen of the display unit 300 (e.g. swiping or scrolling) and generating input signal to the control unit 500.

The display unit 300 displays screens related to the operation state of the mobile device, content, etc. For example, the display unit 300 can display a home screen and various list view screens and execution screens of applications. Particularly, the display unit 300 can display the content partially or entirely under the control of the control unit 500. The display unit 300 may be implemented with a Liquid Crystal Display (LCD), a Light Emitting Diode (LED), an Organic LED (OLED), or an Active Matrix OLED (AMOLED). For example, the display unit 300 can be provided with a touch input interface supporting touch-based input. The display unit 300 can be implemented with a touchscreen for sensing various touch-based user inputs and generating a corresponding input signal to the control unit 500.

The storage unit 400 stores various applications that are executable in the mobile device and data generated with the execution of the applications. The storage unit 400 can be configured with non-volatile and volatile memories. For example, the storage unit 400 may be implemented with a Read Only Memory (ROM), a flash memory, a Random Access Memory (RAM), an internal Hard Disk Drive (HDD), an external HDD, etc.

Additionally, the storage unit 400 stores an Operating System (OS) of the mobile device, and application programs and data related to the input operation through the input interface unit 200, the display operation through the display unit 300, and user preference analysis operation of the mobile device. Particularly, the storage unit 400 stores software components such as the programs for collecting user activity information, processing a user interface, and analyzing user preferences based on the user activity information.

The storage unit 400 includes an activity information Data Base (DB) 410 for recoding the contents information (e.g., text and image data and presentation (display) time information) for the preference analysis, and a preference DB 430 for recording the analyzed preferences based on the content information.

According to an embodiment of the present invention, the user activity information collection program records the content information related to the content data displayed on the display unit 300 in the activity information DB 410. Further, the data recorded in the activity information DB 410 can be used by the preference analysis program and, as a consequence, the user preferences for content data to build the preference DB 430.

The control unit 500 controls overall operations of the mobile device, including operations related to the user preference analysis according to an embodiment of the present invention. For example, the control unit 500 records (or samples) content data presented on the display unit 300 with a presentation time. If a user input is detected on the input interface unit 200 while the content data is presented by the display unit 300, the control unit 500 receives the input signal generated by the input interface unit 200 and controls the function of presenting (e.g. browsing) the content on the screen of the display unit 300 in response to a user input.

Further, the control unit 500 checks and records content data (e.g., text data and image data) presented by the display unit 300 and the presentation time of the content data. The control unit 500 analyzes user activities based on the recorded content data and computes user preferences based on analysis of the content data. In this manner, the control unit 500 can control the operations related to the user preference analysis function according to an embodiment of the present invention.

The control unit 500 also can control the operations related to other functions of the mobile device. For example, the control unit 500 can control the execution of a specific application with the display of the execution screen of the application. The control unit 500 can discriminate among the input signals made through the input interface unit 200 and control the execution of the input command. The control unit 500 also can control data transmission and reception through wired and/or wireless communication links.

Figure 2:
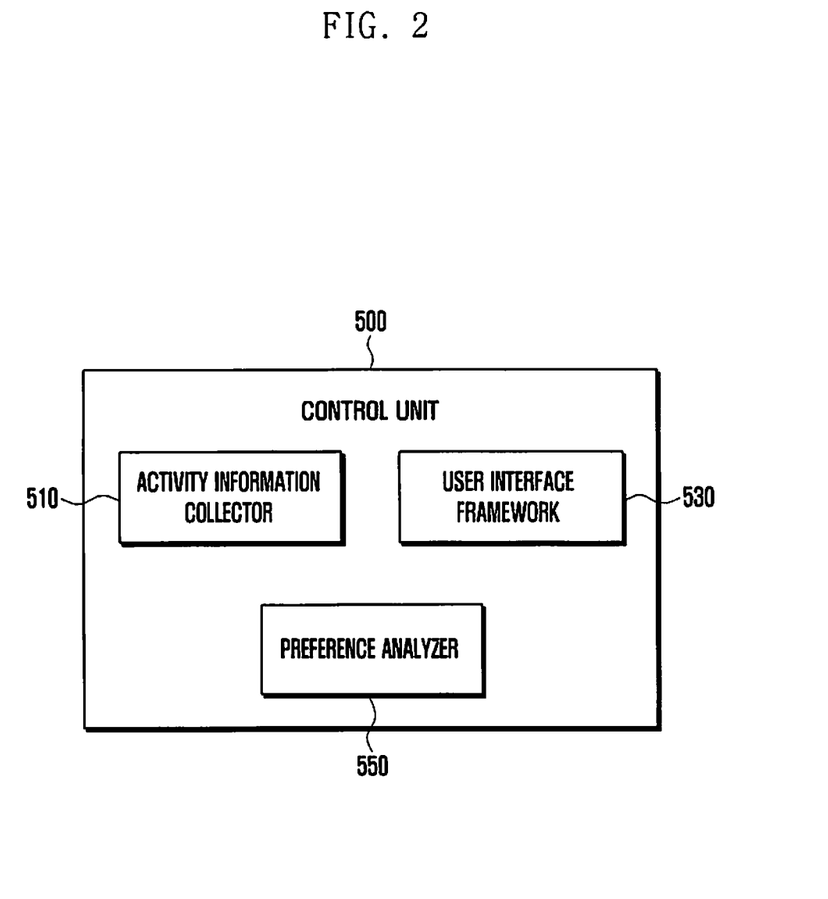
FIG. 2 is a block diagram illustrating a control unit of a mobile device according to an embodiment of the present invention.

FIG. 2 is a block diagram illustrating a control unit of a mobile device according to an embodiment of the present invention.

Referring to FIG. 2, the control unit 500 includes an activity information collector 510 for collecting user activity information, a user interface framework 530 for operating a user interface supported by the mobile device, and a preference analyzer 550 for analyzing user preferences for the content data.

Figure 3:
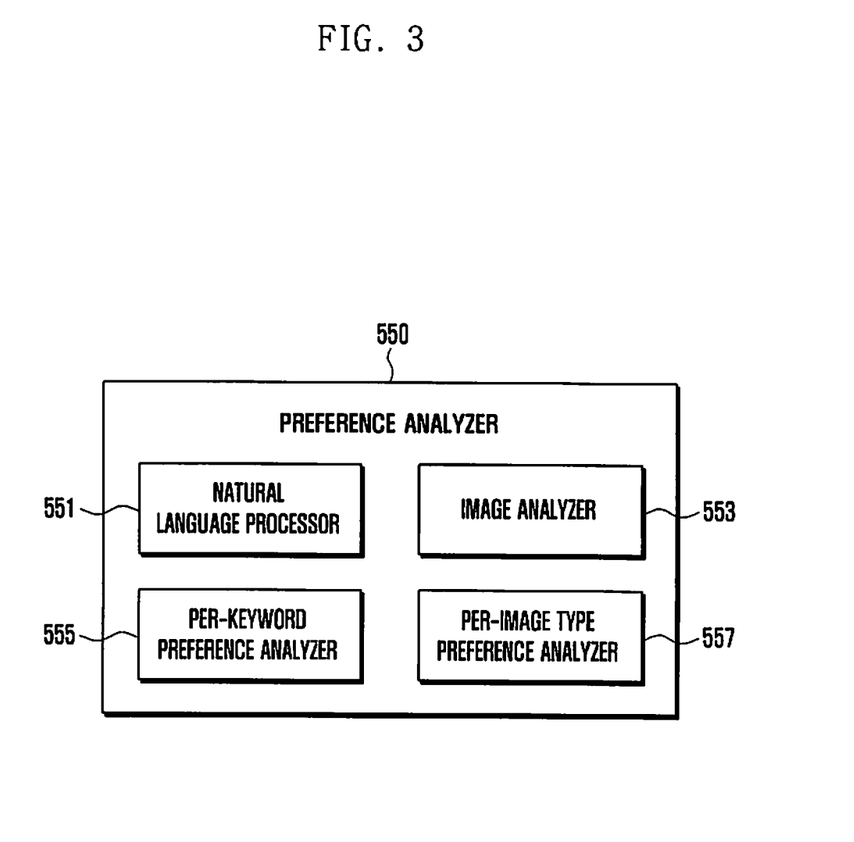
FIG. 3 is a block diagram illustrating a preference analysis unit of a control unit of a mobile device according to an embodiment of the present invention.

FIG. 3 is a block diagram illustrating a preference analysis unit of a control unit of a mobile device according to an embodiment of the present invention.

Referring to FIG. 3, the preference analyzer 550 includes a natural language processor 551 for extracting keywords from a text data, a per-keyword preference analyzer 555 for computing the user preference per keyword with the use of a presentation time duration and difference between a presentation time and a current time as weighting factors, an image analyzer 553 for sorting out images, e.g., according to a predetermined assortment table, and a per-image type preference analyzer 557 for computing user preferences for each image type.

Figure 4:
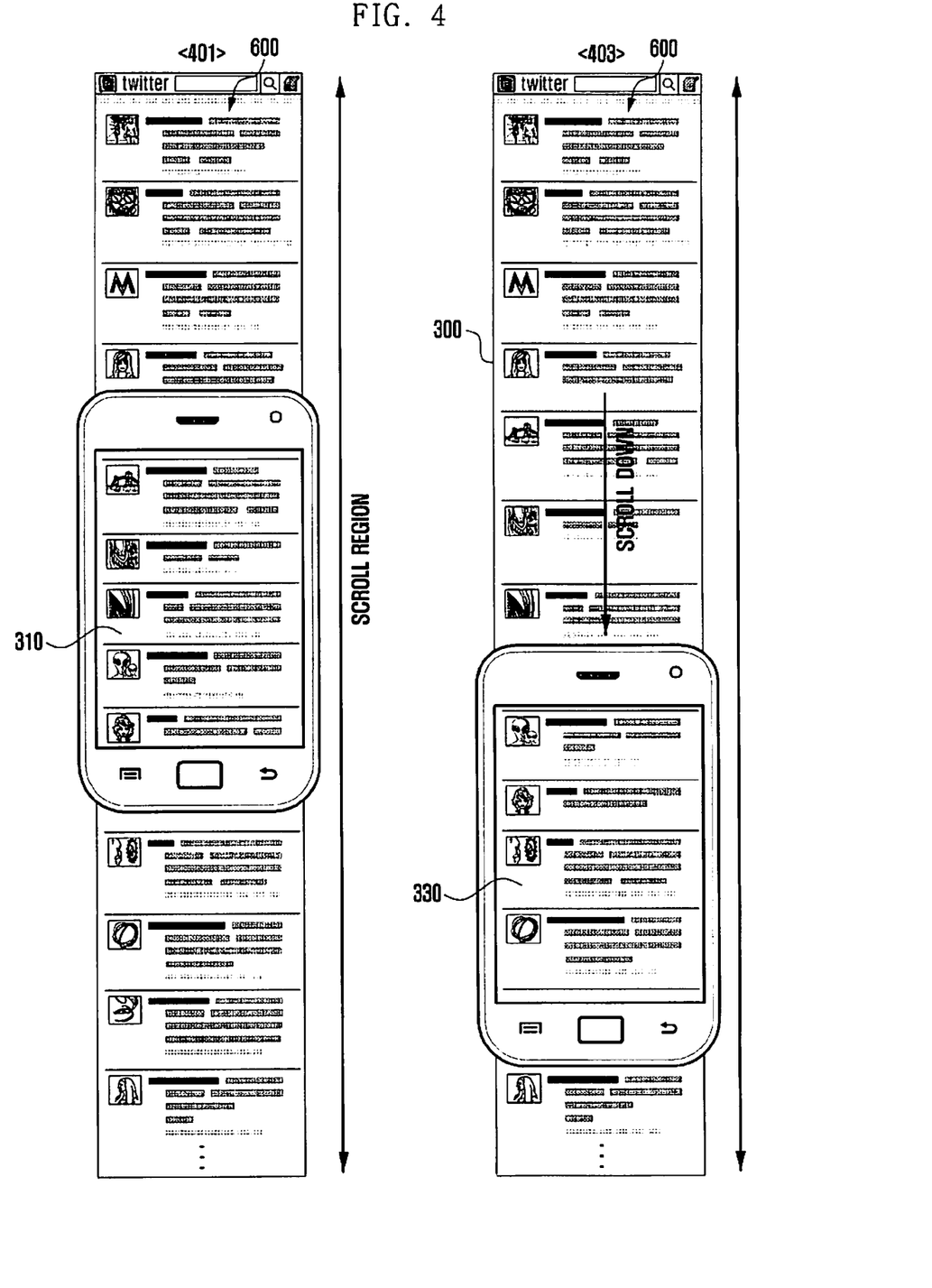
FIG. 4 illustrates content navigation during a user preference analysis method in a display-constrained mobile device according to an embodiment of the present invention.

FIG. 4 illustrates content navigation during a user preference analysis method in a display-constrained mobile device according to an embodiment of the present invention.

Figure 5:
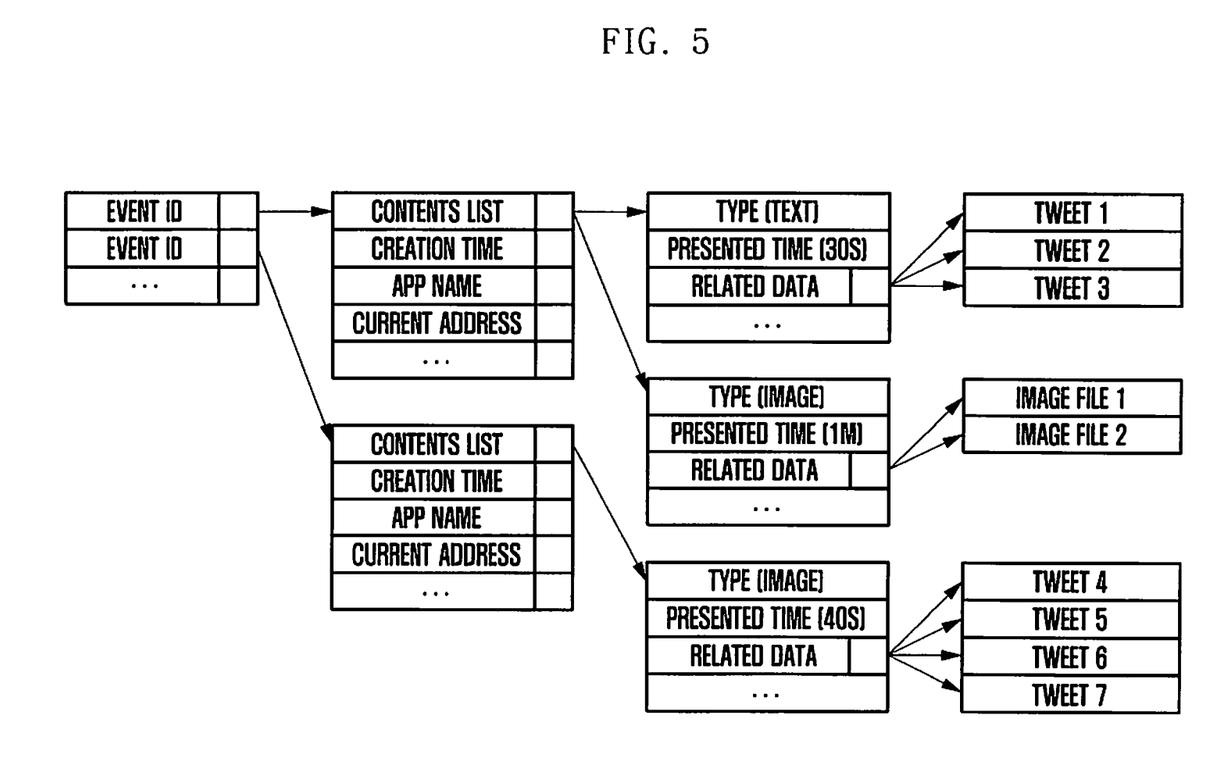
FIG. 5 illustrates a data structure of events related to a user preference analysis method according to an embodiment of the present invention.

FIG. 5 illustrates a data structure of events related to a user preference analysis method according to an embodiment of the present invention.

Referring to FIG. 4, in column 401, a user is browsing content data posted on a user timeline in the current content 600 using a mobile device. Due to the timeline characteristic of the content 600, and the small screen size of the mobile device, it is impossible to display all of the entries in the time line on the screen 310 at one time. Accordingly, the user navigates (e.g., scrolls up or down) to selectively read desired entries in the timeline, as illustrated in column 403.

More specifically, when the user manipulates the mobile device in this way, the user interface framework 530 presents a few of the content data (entries) of the content 600. Once the scrolling up/down and screen switching animation, such as popup action are completed, the content data presented on the screen 330 are transferred to the activity information collector 510 along with the current time information.

The activity information collector 510 generates a new event data structure and unique IDentifier (ID), when the content data is received. The activity information collector 510 records the collected information on the content data and presentation time in the activity information DB 410 of the storage unit 400 in the form of an event data structure.

The activity information collector 510 compares the currently collected content data with the content data recorded in the recently generated event data structure. If there is matching content data, the activity information collector 510 updates the presentation time field of the content data in the event data structure.

The above-described operation can be applied in browsing a webpage. That is, when the user is browsing a mobile webpage by means of the mobile device, the user interface framework 530 collects the information on the content data presented on the current screen and informs the activity information collector 510 of the collected information.

As described above, the mobile device records the presentation time of the content data (text and image data) presented on the screen at the time when the user input is made. After the information on the content data is acquired, the preference analyzer 550 performs an analysis operation based on the information recorded in the activity information DB 410 synchronously or asynchronously.

When the content data is text data, i.e., the information on the content data that has been recorded in the activity information DB 410 indicates text data, the preference analyzer 550 can extract a plurality of keywords (named entities) using the natural language processor 551. For example, the natural language processor 551 extracts keywords using morpheme analysis, attentive word analysis, typo-error analysis, tokenization analysis, and/or semantic analysis. The natural language processor 551 can notify the per-keyword preference analyzer 555 of the extracted keywords.

The per-keyword preference analyzer 555 computes the user preference to each keyword by applying the per-keyword presentation time and difference between a current time and the presentation time as weighting factors. For example, the per-keyword preference analyzer 555 calculates the preference using a moving average, a neutral network, etc. For example, the moving average-based preference computation can be expressed as shown in Equation (1).

$$S_{t_k}(k_i) = \alpha \cdot S_{t_c - i_s} + (1 - \alpha) \cdot \left| \frac{\sum_t \left( \frac{t_d(c_j(k_i))}{t_c - t_j(c_j(k_i))} \right)}{t_c - \max_j (t_i(c_j(k_i)))} \right| \quad (1)$$

In Equation (1), the symbols and functions are of being used for calculating per keyword preference, i.e. $k_i$ denotes an $i^{th}$ keyword, $c_j(k_i)|$ denotes $j^{th}$ text content data in which the keyword appears, $t_c$ denotes a current time, $t_d(c_j(k_i))$ denotes a presentation time of the $j^{th}$ text content data, $t_i(c_j(k_i))$ denotes a most recently presentation time of the $j^{th}$ text content data, $\alpha$ denotes a moving average weight (value in the range of 0~1), and $S_{t_c}(k_i)$ denotes a preference analysis result of the keyword at the current time.

When the content data is image data, i.e., the content data recorded in the activity information DB 410 is image data, the preference analyzer 550 can sort the image data according to the predetermined assortment table via the image analyzer 553. For example, the image analyzer 553 sorts the type of the image data using template matching, edge-detection, Scale-Invariant Feature Transform (SIFT), Gradient Histogram, etc. Assuming that sorting process is performed on an image of a person, the analysis method can discriminate between male and female, and recognizes a specific human face by comparing the image with the individual images stored in the mobile device. The image analyzer 553 transfers the sorted image to the per-image type preference analyzer 557.

The per-image type preference analyzer 557 calculates the user preference to the target image type based on the analysis result and presentation time duration and presentation time of the corresponding image. For example, the per-image type preference analyzer 557 calculates the user preference using a moving average, a neutral network, etc.

The user preference analysis results output by the per-keyword preference analyzer 555 and the per-image type preference analyzer 557 can be recorded in the preference DB 430. The user preference analysis result recorded in the preference DB 430 is then used to selectively provide the user with customized content and advertisement services.

Figure 6:
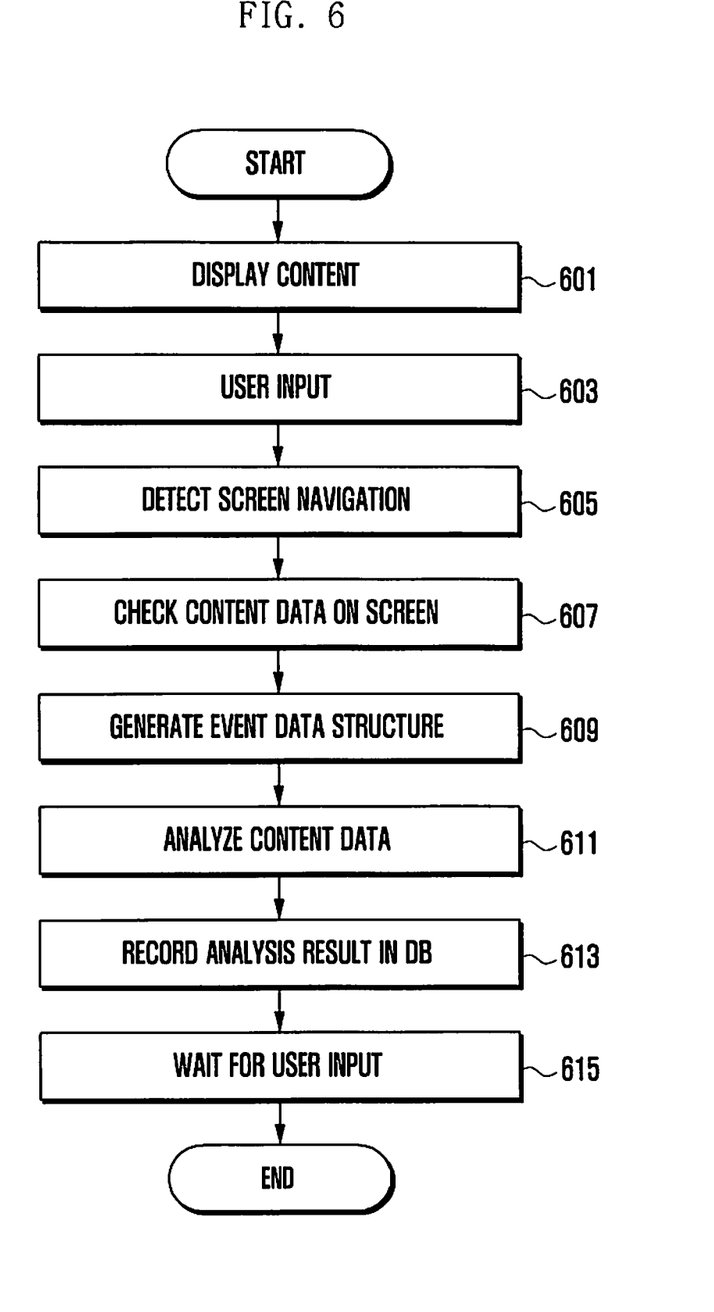
FIG. 6 is a flowchart illustrating a user preference analysis method of a mobile device according to an embodiment of the present invention.

FIG. 6 is a flowchart illustrating a user preference analysis method of a mobile device according to an embodiment of the present invention.

Referring to FIG. 6, the mobile device displays content in response to a user request in step 601. For example, content of a specific application can be displayed on the display unit 500 according to the execution of the application.

In step 603, the mobile device detects a user input while the content is displayed. For example, the user may make an input for scrolling through the content using the input interface unit 200 in the state where the content is displayed. The control unit 500 receives the input signal generated in response to the scroll command input through the input interface unit 200. The content can be composed of at least one of text and image data.

In step 605, the mobile device detects the user input as navigation of the content and in step 607, acquires the content data presented on the current screen at the completion of the navigation. For example, when the content is scrolled up/down, new content data will be presented on the screen. The control unit 500 detects the navigation of the screen and acquires the information on the content data appeared on the screen at the time point when the scroll movement stops, i.e. when the scroll has completed. At this time, the mobile device records the current time information with the acquisition of the information of the content data. The information on the content data and data acquisition time is stored in the activity information collector 510.

In step 609, the mobile device generates an event data structure based on the acquired content data and content data acquisition time. For example, the control unit 500 generates a new event data structure with a unique ID at the content data acquisition time and records the content data and content data acquisition time by reconfiguring the event data structure in the activity DB 410. Again, an exemplary event data structure is illustrated in FIG. 5.

More specifically, the control unit 500 compares the content data recorded at the current time with previously recorded content data in the event data structure, and determines whether there is any matching content data. If there is matching content data, the control unit 500 updates the presentation time field of the matching content data in the event data structure. The event data structure can be generated by the activity information collector 510.

After the event data structure has been generated, i.e., when the content is are recorded, the control unit 500 performs user preference analysis operation based on content data information in step 611. The analysis operation can be performed by the preference analyzer 550. The preference analysis operation in step 611 will be described in more detail below with reference to FIG. 7.

In step 613, the mobile device records the user preference analysis result related to the content data in the preference DB 430. For example, the control unit 500 computes user preferences for the text and image data, and records the user preference information in the preference DB 430.

In step 615, the mobile device waits for a user input. For example, the control unit 500 monitors for a user input such as scroll command for scrolling the content across the screen and re-analyzes the user preference of the content data presented on the screen, as described above.

Figure 7:
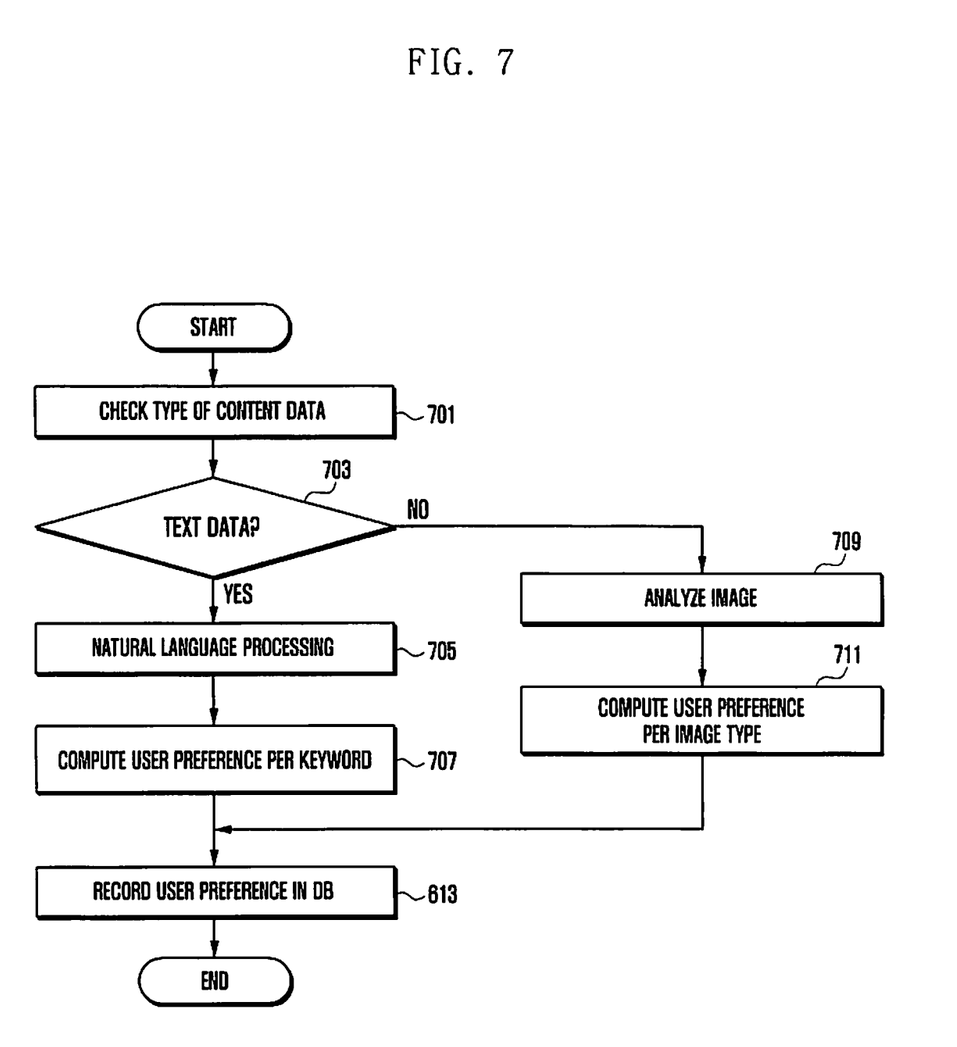
FIG. 7 is a flowchart illustrating a user preference analysis method of a mobile device according to another embodiment of the present invention.

FIG. 7 is a flowchart illustrating a user preference analysis method of a mobile device according to an embodiment of the present invention.

Referring to FIG. 7, after the content data has been recorded, e.g., as described above with reference to step 609 of FIG. 6, the mobile device checks the content data in step 701 and determines whether the content data is text data or image data in step 703. As described above, the content data may include at least one of text data and image data. Accordingly, the control unit 500 determines the type of the content data, i.e., text data or image data.

When the content data is text data, i.e., if the data recorded in the activity information DB 410 is text data, the mobile device performs a natural language process in step 705. For example, the mobile device extracts a plurality of keywords included in the text data using the natural language processor 551 of the preference analyzer 550. For example, the mobile device can extract keywords using at least one of morpheme analysis, attentive word analysis, typo-error analysis, tokenization analysis, and semantic analysis.

In step 707, the mobile device computes user preferences for the respective keywords extracted through the natural language process. For example, the mobile device computes a user preference for each keyword using a difference between the presentation time and a current time as weighting factor using the per-keyword analyzer 555. For example, the preference computation can be performed using a moving average, a neutral network, etc.

When the content data is image data in step 703, i.e., when the data recorded in the activity information DB 410 is image data, the mobile device performs image analysis in step 709. For example, the mobile device performs a sorting operation on image data included in the content according to a predetermined assortment table using the image analyzer 553 of the preference analyzer 550. For example, the mobile device sorts the type of the image data using template matching, edge-detection, SIFT, a Gradient Histogram, etc., by the image analyzer 553. For example, the mobile device discriminates between male and female images and sorts the type of the image by comparing the image with the respective images stored in the mobile device.

In step 711, the mobile device computes a user preference for each image type sorted through the image analysis. For example, the mobile device calculates the user preference for each image using the presentation time duration and presentation time of each image via the per-image type preference analyzer 557 of the preference analyzer 555. Again, the user preference can be calculated using a moving average, a neutral network, etc.

Although not illustrated in FIG. 7, when content data includes both text data and image data, it is possible to compute the user preferences for both of the text and image data though the above described analysis operation.

Finally, the mobile device records the user preferences computed for the respective text and image data in the preference DB 430 in step 613, as described above.

The above-described user preference analysis methods and apparatuses according to various embodiments of the present invention can also be implemented in the form of computer-executable program commands and stored in a computer-readable storage medium. The computer readable storage medium may store the program commands, data files, and data structures in individual or combined forms. The program commands recorded in the storage medium may be designed and implemented for various embodiments of the present invention or used by those skilled in the computer software field.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using an interpreter as well as machine language codes created by a compiler. The aforementioned hardware device can be implemented with one or more software modules for executing the operations of the various embodiments of the present invention.

As described above, the user preference analysis methods and apparatuses of the present invention improve the reliability of user preferences by computing the user preferences in consideration of the content data actually presented on the screen and the content presentation (display) time duration.

Further, the user preference analysis method and apparatus of the present invention analyze the user preference with the content data that are actually of interest by the user. That is, by recording information on the content data that is actually displayed on the screen and the presentation (display) time duration of the content data, and performing user preference analysis based on the recorded information, the user preference analysis method and apparatus of the present invention improves the accuracy of user preference analysis over the conventional art.

Additionally, the user preference analysis method and apparatus of the present invention excludes noise content data that is not of interest to the user from the user preference analysis process, thereby avoiding the Garbage In Garbage Out effect during the preference analysis process.

As a result, the user preference analysis methods and apparatuses of the present invention provide a user with customized content and advertisement services based on reliable user preferences. The present invention can be applied to various types of mobile devices and their equivalents. The present invention is capable of performing the user preference analysis in the optimized environment so as to contribute the competitiveness of the user, service provider, and mobile device manufacturer.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A user preference analysis method by a device, the method comprising:
   displaying content;
   sensing a user input for navigating content data of the content to select the content data to be displayed, the content data being a fragment of data constituting the content;
   displaying the content data on a screen of the device in response to the user input;
   recording content information about the content data currently displayed on the screen by collecting the content information when content navigation from the user input is completed;
   analyzing a user preference based on the recorded content information; and
   storing a user preference analysis result for the content data,
   wherein the content information includes the content data, at least one of text data or image data constituting the content, and a presentation time duration that the content data has been displayed on the screen.

2. The method of claim 1, wherein recording comprises recording the information on the content data and the presentation time duration of the content data.

3. The method of claim 1, wherein recording the content information comprises:
   recording the collected content information with a presentation time.

4. The method of claim 1, wherein recording the content information comprises:
   determining whether the content information about the content data currently displayed on the screen matches previously recorded content information of the content data; and
   updating the presentation time of the previously recorded content information of the content data, when the content information about the content data currently displayed on the screen matches the previously recorded content information of the content data.

5. The method of claim 1, wherein analyzing the user preference comprises checking a type of the content data currently displayed on the screen.

6. The method of claim 5, wherein analyzing the user preference comprises:
   identifying the content data currently displayed on the screen as text data;

extracting a keyword from the text data through natural language processing; and computing a user preference for the keyword.

7. The method of claim 6, wherein computing the user preference for the keyword comprises:

calculating a difference between a presentation time for the keyword and a current time; and computing the user preference for the keyword based on the difference.

8. The method of claim 5, wherein analyzing the user preference comprises:

identifying the content data currently displayed on the screen as image data;

extracting images from the image data through image analysis;

sorting the images by type using a predetermined assortment table; and computing a user preference for each sorted image.

9. The method of claim 8, wherein computing the user preference for each sorted image comprises calculating the user preference for the sorted image using a presentation time duration and a presentation time for each image, respectively.

10. A user preference analysis method by a device, the method comprising:

displaying content data on a screen of the device in response to a user input, the content data being a fragment of data constituting the content;

recording content information about the content data that is currently displayed on the screen of the device by collecting the content information when content navigation from the user input is completed;

extracting keywords and images from the recorded content information;

analyzing a user preference for each extracted keyword and image; and storing the analyzed user preference for each extracted keyword and image, wherein the content information includes the content data, at least one of text data or image data constituting the content, and a presentation time duration that the content data has been displayed on the screen.

11. The method of claim 10, wherein analyzing the user preference for each extracted keyword and image comprises computing the user preference using the presentation time duration and a presentation time as parameters.

12. A device that performs user preference analysis, the device comprising:

a display unit that displays content data, the content data being a fragment of data constituting the content;

an input interface unit that receives a user input for navigating the content data of the content displayed on the display unit;

a storage unit that stores a program for analyzing a user preference, stores content information about the content data for use in preference analysis, and stores a user preference analyzed using the content information; and a control unit that records the content information by collecting the content information when the user input for navigating the content data is completed, the content information including the content data, at least one of text data or image data constituting the content, and a presentation time duration that the content data has been displayed on the display unit, and computes the user preference for the content data based on the content information.

13. The device of claim 12, wherein the control unit computes the user preference for the content data using the presentation time duration and the presentation time of the content data as parameters.

14. The device of claim 13, wherein the control unit comprises:

an activity information collector that collects information on user activities;

a user interface framework that operates a user interface of the device; and a preference analyzer that analyzes the user preference for the content data.

15. The device of claim 14, wherein the preference analyzer comprises:

a natural language processor that extracts keywords of text data included in the content data;

a per-keyword preference analyzer that computes a user preference for each keyword using a difference between a most recent presentation time and a current presentation time of the keyword;

an image analyzer that sorts image data included in the content data by referencing a predetermined assortment table; and a per-image type preference analyzer that computes a user preference for each image type using a presentation time duration and a presentation time of each image, respectively.

16. A non-transitory computer readable recording medium having recorded thereon a computer program for executing a user preference analysis method in a device, the method comprising:

displaying content data on a screen of the device in response to a user input, the content data being a fragment of data constituting the content;

recording content information about the content data currently displayed on the screen by collecting the content information when content navigation from the user input is completed;

analyzing a user preference based on the recorded content information; and storing a user preference analysis result for the content data, wherein the content information includes the content data, at least one of text data or image data constituting the content, and a presentation time duration that the content data has been displayed on the screen.

17. A user preference analysis method by a mobile device, the method comprising:

receiving a user input for navigating content data displayed on a screen of the device, the content data being a fragment of data constituting the content;

recording the content data currently displayed on the screen by collecting content information about the content data once the navigation is completed; and analyzing a user preference based on the content data, wherein the content data includes at least one of text data or image data constituting the content, and a presentation time duration that the content data has been displayed on the screen.

18. The user preference analysis method of claim 17, further comprising:

extracting keywords and images from the content data; and analyzing a user preference for each extracted keyword and image.

* * * * *